United States Patent [19]
Coulter

[11] 3,768,350
[45] Oct. 30, 1973

[54] APPARATUS FOR CUTTING WORKPIECES
[75] Inventor: Leland E. Coulter, New Canaan, Conn.
[73] Assignee: Teledyne, Inc., Los Angeles, Calif.
[22] Filed: Mar. 21, 1972
[21] Appl. No.: 236,694

[52] U.S. Cl. .......................... 83/51, 83/74, 83/488, 83/471.1, 83/471.2, 83/508.2, 51/40, 51/165.87
[51] Int. Cl. .............................................. B26d 3/16
[58] Field of Search .................. 83/51, 72, 74, 487, 83/488, 489, 471.1, 508.2, 471.2, 471.3; 51/40, 81, 165.87

[56] References Cited
UNITED STATES PATENTS
2,243,303  5/1941  Wells ................................ 83/488 X
3,413,881  12/1968 Stolzer ................................ 83/51 X
3,680,417  8/1972  Wells ................................. 83/74
2,722,087  11/1955 Hamilton ........................... 51/40 X
3,664,217  5/1972  Schiewek et al. .................. 83/74 X
3,386,322  6/1968  Stone et al. ........................ 83/488
2,894,360  7/1959  Alvord ............................ 51/165.87

Primary Examiner—Andrew R. Juhasz
Assistant Examiner—W. D. Bray
Attorney—Ronald J. St. Onge

[57] ABSTRACT

A machine for cutting workpieces such as castings or metal barstock is described wherein a pair of cutting wheels are controllably fed into the barstock to sever the end thereof with a single pass. The cutting wheels, which operate in a common plane, are located with their axes offset and their perimeter edges are located on a common straight cutting path. A lateral control to automatically maintain the cutting wheels on the path even though their diameters are worn down by the cutting operation and a vertical control to preserve the offset between the axes are described.

12 Claims, 4 Drawing Figures

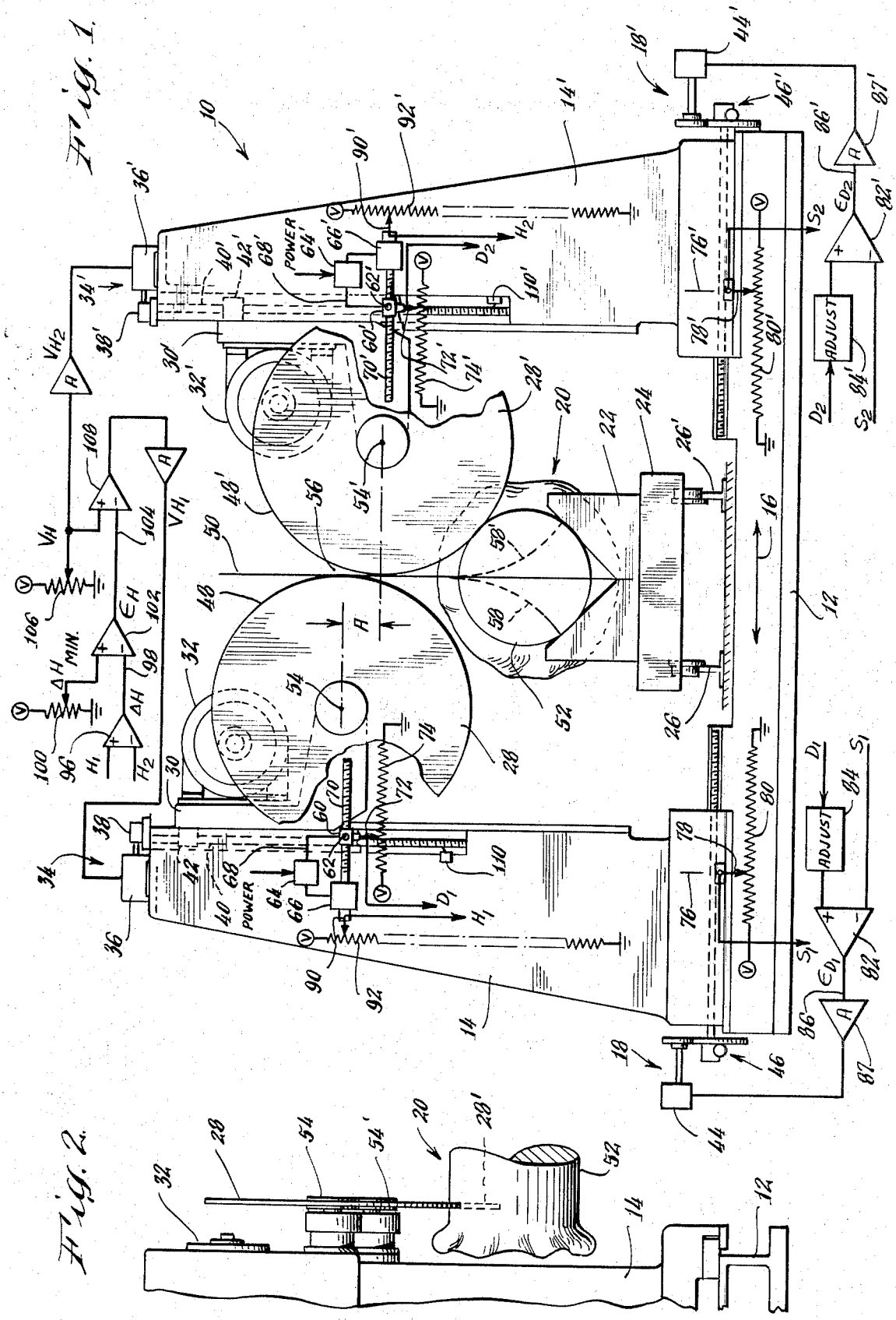

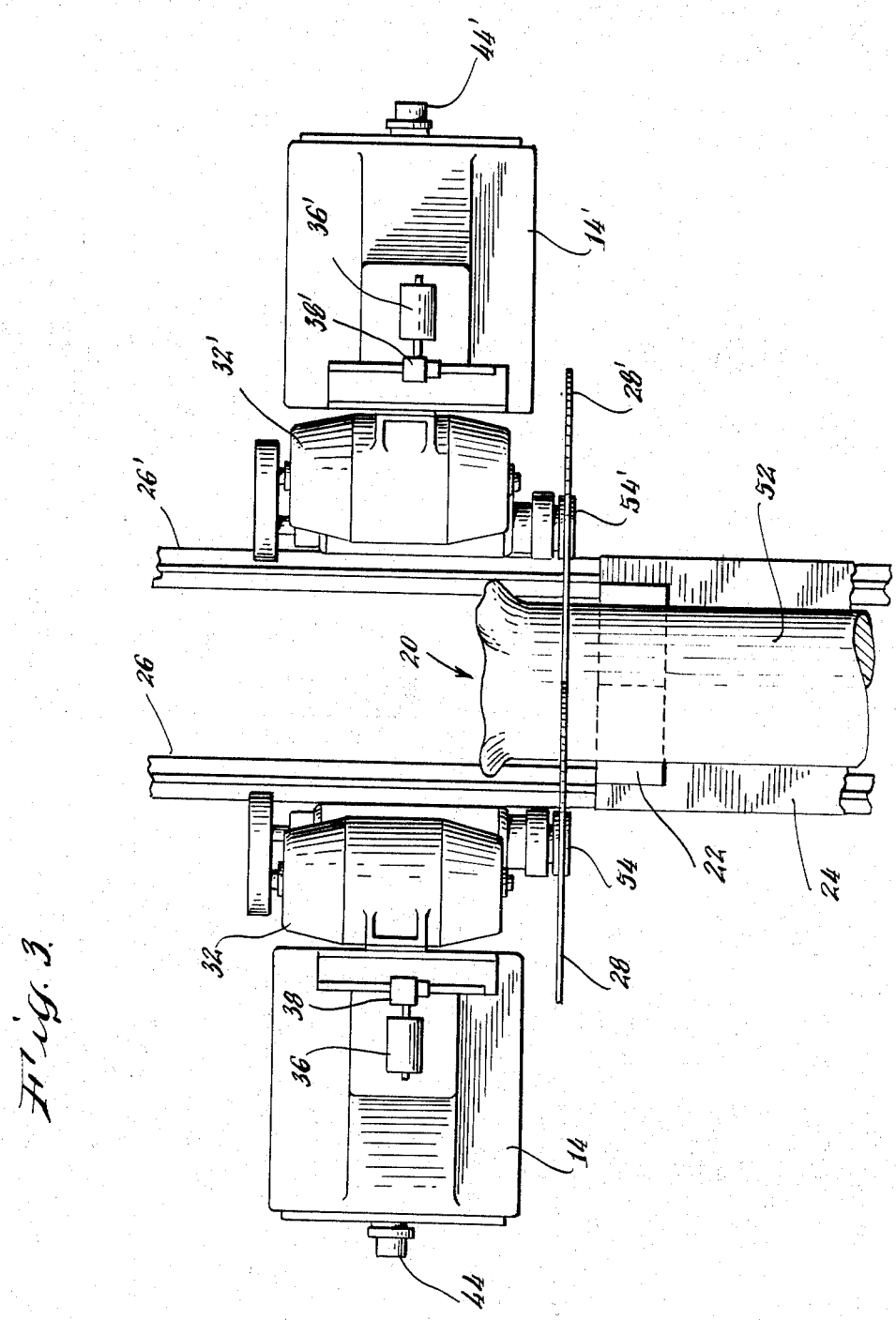

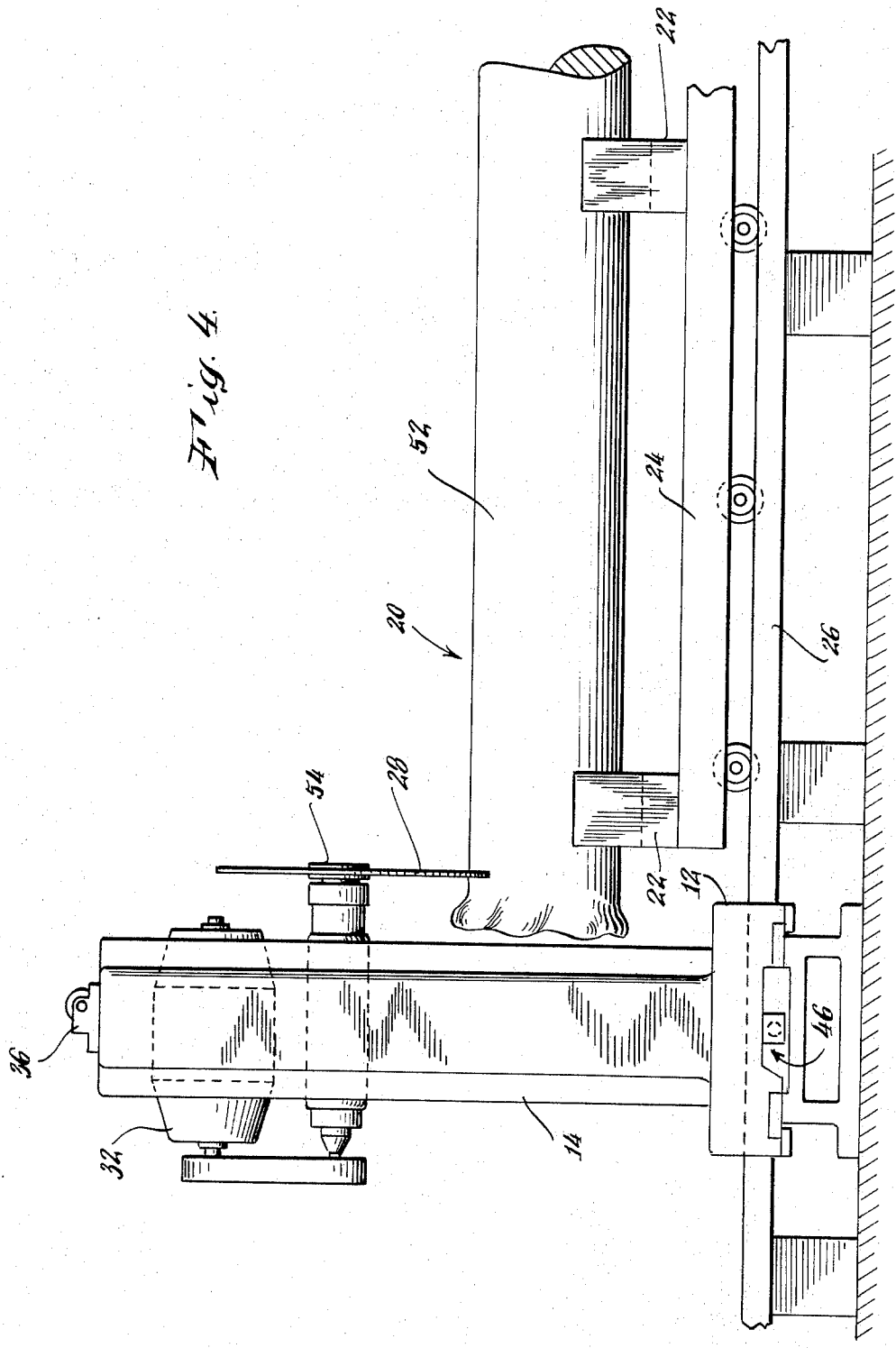

APPARATUS FOR CUTTING WORKPIECES

This invention generally relates to an apparatus for cutting workpieces such as castings, metal barstock and the like and, more specifically, to a machine and a method for controlling a pair of cutting wheels used to cut off the end piece of metal barstock.

BACKGROUND OF THE INVENTION

Cutting-off machines are known in the art, see for example the U.S. Pat. No. to White 2,165,118. As described in White, a pair of cutting wheels is revolved around a barstock and fed into the material along a spiral path until the workpiece is cut to a predetermined depth. At this depth, one of the wheels is retracted and a final cut of the workpiece is made with the other wheel to sever the end piece.

SUMMARY OF THE INVENTION

In a cutting-off machine in accordance with the invention, a pair of cutting wheels is employed. The cutting wheels are controlled so that their perimeter cutting edges advance along a common straight cutting path towards a workpiece. The cutting wheels are selectively spaced from one another so as to offset their axes of rotation along the common path and cut the workpiece with a single pass.

The positions of the cutting wheels are laterally controlled to compensate for wheel diameter changes due to wear. Detectors are employed to locate the perimeters of the cutting wheels and provide signals to drive lateral infeed mechanisms which maintain the wheel perimeters aligned along the common cutting path. Vertical position sensors provide signals which are used to maintain the offset of the cutting wheel axes.

An advantage of a cutting machine in accordance with the invention, resides in its high speed cutting capability with a safe and practical machine structure. It is, therefore, an object of the invention to provide a machine for cutting off barstock in an expedititous and automatic manner. These and other advantages and objects of the invention will be understood from the following description of a preferred embodiment described in conjunction with the drawings wherein FIG. 1 is a front view in elevation of a cutting-off machine in accordance with the invention with electrical control features shown in schematic form;

FIG. 2 is a side view in elevation of the cutting side of the machine shown in FIG. 1;

FIG. 3 is a top plan view of the cutting-off machine of FIG. 1; and

FIG. 4 is a full side view in elevation of the cutting-off machine shown in FIG. 1.

DETAILED DESCRIPTION OF EMBODIMENT

With reference to FIG. 1, a cutting machine 10 in accordance with the invention is shown formed with a floor supported machining bed 12. The bed 12 supports a pair of upright columns 14—14' which may be moved laterally along ways (not visible in the view of FIG. 1) in the direction of double headed arrow 16 with the use of actuators 18—18'. A metal barstock workpiece 20 is supported on a pair of V-blocks 22 which, in turn, are mounted on a dolly 24. Dolly 24 is supported by rails 26—26' to facilitate the operative placement of workpiece 20 beneath a pair of cutting wheels 28—28'. The cutting wheels 28 may be grinding wheels or carbide wheels or any other suitable round cutting saw.

Cutting wheels 28—28' operate in a common plane and are mounted on wheel frames 30—30' which are, in turn, respectively mounted for vertical motion along upright columns 14—14'. Each wheel 28 is driven into rotation by an electric DC motor 32 which is also mounted on a wheel frame 30. Wheel frames 30—30' are moved along columns 14—14' under the control of vertical actuators 34—34'. The actuators 34 include electric motors 36—36' which operate through gear drives 38—38' to rotate lead screws 40—40'. Ball or roll nuts 42—42' couple lead screws 40 to wheel frames 30.

Lateral movement of wheels 28 to compensate for their wear is obtained by moving columns 14—14' with actuators 18—18', each of which includes a DC motor 44 and ball and lead screw mechanism 46.

Wheels 28—28' are operated in a manner whereby their perimeter edges 48—48' are aligned on a common straight cutting path 50. The location of path 50 is chosen to bisect the cylindrical segment 52 of workpiece 20 whereby each cutting wheel, as it is fed into the workpiece, cuts through the same amount of metal. Wheels 48 may overlap path 50 by a desired amount. Hence, when wheels 28 are indicated as "on" the path 50, their overlap of path 50, as well as any immediately position by which a single cutting pass is needed to sever heavy workpiece 20, is included.

Cutting wheels 28—28' are vertically spaced to offset their axes 54—54' a distance A, measured along path 50, and selected to enable perimeter edges 48 to lie on common cutting path 50 while the wheels are separated by a small gap 56. With the described location of the cutting edges 48, the down-feed of wheels 28 by vertical actuators 34 would initially proceed along path 50. However, as the cutting operation proceeds, the wear of wheels 28 would result in a separation of the cutting paths as suggested by dotted cutting path lines 58—58'.

A lateral adjustment of wheels 28—28' to compensate for the wear of wheels 28 is obtained with the aid of edge followers 60—60'. Edge followers 60 are mounted on wheel frames 30 and are formed of edge detectors 62—62', control networks 64—64' and detector motors 66—66'. The edge detectors 62—62' may be formed of pneumatic sensors or photocell arrangements which are well known in the art and need not be further described. The detectors 62—62' provide output signals on lines 68—68' indicative of the change in the location of edges 48 and applied to networks 64 to drive motors 66. Motors 66, in turn, operate lead screws 70 to alter the position of edge followers 60 relative to edges 48 until output signals on lines 68 are indicative of detector alignment with edges 48.

In effect, therefore, detectors 62 follow edges 48 as the wheels reduce in diameter during cutting of the workpiece 20. Contacts 72—72' are mounted on edge followers 60—60' and contact longitudinal identical resistive elements 74—74' to provide diameter signals $D_1$ and $D_2$ which are respectively indicative of the location of wheel edges 48—48' relative to columns 14—14'. Resistive elements 74—74' are suitably energized by a stable voltage source and are precisely mounted relative to reference lines 76—76' on columns 14—14' respectively.

Columns 14—14', in turn, are provided with contacts 78—78' which contact longitudinal identical resistive elements 80—80' mounted on machining bed 12. Contacts 78 are in alignment with reference lines 76 and generate column position signals $S_1$ and $S_2$ when resistive elements 80 are energized by a voltage source. Since the resistive elements 80 are precisely located on bed 12 relative to workpiece 20, signals $S_1$ and $S_2$ are also indicative of the distance between columns 14 and the desired cutting path 50. The combination of the diameter signal $D_1$ and column position signal $S_1$ and signals $D_2$ and $S_2$ provide precise information of the location of edges 48—48' relative to common cutting path 50.

In the lateral control of wheels 28 with compensation of edge wear of the wheels, both signal pairs $D_1$-$S_1$ and $D_2$-$S_2$ are applied to comparison networks 82—82' respectively. Signals $D_1$ and $D_2$ are applied through adjusting circuits 84—84' to compensate for initial start-up conditions. As the diameter signals $D_1$ and $D_2$ vary due to changes in the diameter of cutting wheels 28, error signals $\epsilon_D$ are generated on output lines 86—86' which, in turn, after suitable amplification with amplifiers 87—87', drive motors 44—44' to laterally move columns 14—14'. This lateral motion of columns 14—14' in turn compensates for the wear of cutting wheels 28—28' until error signals on lines 86—86' are nulled out.

Since the cutting wheels 28—28' are fed downwardly towards the workpiece 20 under control by separate motors 36—36' and operate in a common plane, the offset A between axes 54—54' is carefully maintained. Each wheel frame 30 supports a vertical contact 90 which contacts in turn a like vertically disposed resistive element 92. The output signals $H_1$ and $H_2$ obtained from contacts 90 are indicative of the vertical position of the wheel frames relative to the same vertical reference and thus also the vertical position of axes 54—54'.

Vertical position signals $H_1$ and $H_2$ in turn are compared to each other in network 96 to produce a signal H on line 98 indicative of the sensed vertical off-set A between axes 54 and 54'. The off-set signal $\Delta$ H on line 98 is, in turn, compared with a reference signal $\Delta$ $H_{MIN}$, obtained from a potentiometer 100 and indicative of the minimum allowable off-set. Network 102, wherein $\Delta$ H and $\Delta$ $H_{MIN}$ are compared, is of the type whereby the output on line 104 remains unchanged or zero as long as the sensed off-set $\Delta$ H is larger than the minimum permitted by the $\Delta$ $H_{MIN}$ signal.

Whenever the sensed off-set signal $\Delta$ H falls below the minimum, an error off-set signal $\epsilon$ H is produced on line 104 and used to reduce the drive to the motor 36 of the lagging cutting wheel 28. Both motors 36 and 36' are supplied with a common velocity drive signal $V_H$ obtained from potentiometer 106. The drive signal $V_H$ for motor 36, however, is coupled with error signal $\epsilon_H$ to a subtract network 108, which reduces the drive signal $V_H$ by the amount of error signal $\epsilon_H$ to thus retard wheel 28 and restore the desired off-set between axes 54—54'.

The control circuits employed to maintain off-set A along path 50 by wheels 28—28' may be selected from available commercial sources. The precise control achievable may be supplemented with safety circuits which go into effect upon the occurrence of certain conditions. For example, limit switches 110—110' are located near the bottom travel ends of wheel frames 30 to halt the down feed of wheels 28. In addition, a cross coupling network can be added to reference the operation of the lateral control circuits 82 to a particular lateral position on machining bed 12. Such network would aid in preventing lateral drifts of the actual cutting path 50 during a cutting operation.

In the operation of the cutting machine 10, the cutting wheels 28—28', which may have a diameter of 60 inches each, are at first manually aligned so that their axes 54—54' are vertically off-set by about 8 inches while perimeter cutting edges 48—48' are laterally positioned on common path 50. The edges laterally overlap on path 50 by about 0.06 inches.

With the wheels 28 in this position, as illustrated in FIG. 1, the adjust networks 84—84' are actuated so that the outputs on lines 86—86' are each nulled or zero. The machine vertical downfeed speed $V_H$ is selected and operation is commenced.

As the cutting wheels advance downwardly into workpiece 20, wheel 28' begins to wear and its change in diameter is detected, with a reduction in the magnitude of signal $D_2$. This change causes the error signal on line 86' to increase and, after amplification, motor 44' is actuated to adjust column 14' laterally inwardly until the signal on line 86' is nulled out again. A similar procedure is followed for the other column 14 and cutting wheel 28 so that the entire cutting operation of workpiece 20 proceeds in an even manner along common cutting path 50.

The advantages of the described embodiment and operation can be appreciated with reference to FIGS. 3 and 4. The cutting of large workpieces 20 with cutting wheels in a grinding operation requires wheel drive motors 32 of substantial size (of the order of 100 horsepower each). The separation of the rotational drives of cutting wheels into two motors 32 permits their mounting on laterally movable columns 14 which, in turn, may be moved with practically sized actuators 44 to preserve a precise desired lateral overlap of cutting wheel edges 48 on common path 50. Protective hoods and covers, as well as cooling devices for the cutting wheels, have been deleted for clarity of description of the preferred embodiment of this invention.

It will thus be seen from the preceeding description, that the advantages and objects of the invention are efficiently attained. Since certain changes may be made in carrying out the above method and machine without departing from the scope of the invention, it is intended that the above description shall be interpreted as illustrative and not in a limiting sense.

What is claimed is:

1. An apparatus for cutting workpieces such as metal straight and the like with cutting wheels driven into rotation about their axes comprising a pair of cutting wheels operative in a common plane and having parallel axes of rotation, mens for advancing the rotating cutting wheels along a traight common cutting path towards the workpiece, said cutting wheels being operatively selectively spaced from each other along the straight path to offset the wheel axes, with said cutting wheels further being laterally spaced to locate their perimeter edges on said common straight path, means for sensing the location of the perimeter of said wheels and producing diameter signals indicative thereof, and means responsive to said diameter signals to maintain the perimeter cutting edges of the wheels on said straight common path.

2. The apparatus for cutting workpieces as claimed in claim 1 and further including
means for producing axis position signals effectively representative of the location of the axes of the cutting wheels along said straight common path and applying the axis position signals to said advancing means to maintain said offset.

3. The apparatus for cutting workpieces as claimed in claim 2 wherein said means for sensing the perimeter cutting edges of the cutting wheels further includes
a pair of edge detectors in operative position to sense the perimeters of respective cutting wheels, said edge detectors each producing an edge signal representative of the sensed cutting wheel perimeters,
detector adjusting means effectively responsive to the edge signals to maintain said detectors in operative sensing relationship with the perimeters of the cutting wheels, and
means responsive to the effect of said adjusting means for producing said diameter signals to indicate the location of the cutting wheel perimeter edges.

4. The apparatus for cutting workpieces as claimed in claim 3 wherein said means for maintaining the cutting wheels on the common path further includes
means for producing path position signals representative of the location of the common path,
means respectively responsive to the path position signals and the diameter signals for generating lateral feed control signals representative of the distance between the perimeter of the cutting wheels and the common path, and
lateral drive means responsive to said lateral feed control in claim to maintain said cutting wheels respectively on the common straight cutting path.

5. The apparatus for cutting workpieces as claimed inclaim 2 wherein said means responsive to the axis position signals further includes
means for comparing said axis position signals and producing an offset signal indicative thereof,
means for generating advancing signals representative of the desired feeding speed of the cutting wheels along said common path towards the workpiece,
means for producing a desired offset signal indicative of the minimum desired tolerable offset between the axes of the cutting wheels, and
means responsive to the axis position signals and the desired offset signal for altering one of the advancing signals and effect a change in the feed of one of said cutting wheels to maintain the desired offset between the cutting wheel axes.

6. A machine for cutting workpieces such as metal barstock and the like with cutting wheels driven into rotation about their axes comprising
a machining bed for supporting a workpiece,
a pair of support columns mounted on the machining bed,
means for moving the support columns on the machining bed in lateral directions towards and away from each other,
a pair of wheel frames respectively movably mounted on the support columns,
means for moving the wheel frames on the columns in vertical directions,
a pair of cutting wheels operative in a common plane and having parallel axes of rotation, said cutting wheels being mounted on the wheel frames, and
means for maintaining said cutting wheels effectively on a common vertical straight path along which the cutting wheels are moved towards the workpiece.

7. The machine for cutting workpieces as claimed in claim 6 wherein said maintaining means further includes
means for producing path position signals indicative of the distances between the columns and the common vertical straight path,
means mounted on the wheel frames for sensing the position of the cutting wheel perimeters and producing diameter signals indicative thereof,
means responsive to the path position signals and the diameter signals for controlling said support columns moving means to maintain the cutting wheel perimeters on the common path.

8. The machine for cutting workpieces as claimed in claim 7 wherein said wheel frame moving means further includes
means for effectively detecting the location of the cutting wheel axes along the common path and producing axis position signals indicative thereof,
means for comparing said axis position signals and producing an offset signal indicative of the vertical separation of the cutting wheel axes, and
means responsive to the offset signal for producing velocity down feed signals to control the advance of said wheel frames along the common path, said down feed signals being produced with magnitudes to maintain the desired offset distance between the cutting wheel axes.

9. The machine for cutting workpieces as claimed in claim 8 wherein said diameter signal producing means further includes
pneumatic wheel edge detectors providing edge signals representative of the detected wheel edges, and
means responsive to the edge signals to maintain the pneumatic wheel edge detectors in proximity of the edges of the cutting wheels during operational wear thereof.

10. A method for cutting workpieces such as metal barstock and the like with cutting wheels which exhibit wear thereof while cutting a workpiece and wherein the cutting wheels operate in a common plane with parallel axes of rotation comprising the steps of
positioning a cutting wheel in a lead position near the workpiece in front of the other cutting wheel with the rear cutting wheel being located with its perimeter cutting edge on a common straight feed path with the perimeter edge on the lead cutting wheel,
advancing both rotating cutting wheels towards the workpiece along the common straight feed path while maintaining a desired separation of the cutting wheels along the common straight path, and
feeding the cutting wheels laterally inwardly towards the workpiece in direct proportion with the wear of each cutting wheel to maintain the perimeter cutting edges of the wheels on the common straight path.

11. The method of cutting workpieces as claimed in claim 10 wherein said positioning step includes positioning the cutting wheels above the workpiece with said advancing step being directed downwardly onto the workpiece.

12. The method of cutting workpieces as claimed in claim 11 wherein the feeding step further includes
effectively measuring the lateral distance between the cutting wheels,
measuring the change in the diameter of the wheels due to their wear while cutting the workpiece, and
laterally moving the cutting wheels towards each other to compensate for their wear while maintaining a desired lateral separation between the cutting wheels.

* * * * *